Dec. 23, 1952  W. V. SMITH  2,622,335
REEL LOCATOR
Filed Aug. 25, 1950

W. V. Smith
INVENTOR
BY C. A. Knowles.
ATTORNEYS.

Patented Dec. 23, 1952

2,622,335

UNITED STATES PATENT OFFICE 2,622,335

REEL LOCATOR

William V. Smith, Greenville, Ill.

Application August 25, 1950, Serial No. 181,495

1 Claim. (Cl. 33—185)

This invention relates to a device adapted to support a level and formed specifically for locating the reel of a lawn mower in proper position relative to a grinding wheel, thus to cause the blades of the mower to be sharpened with an exact, predetermined backrake or angle relative to the surface of the bed knife traversed thereby.

The invention has reference to a tool particularly adapted for use with a lawn mower machine such as that shown in my Patent No. 2,281,055 of April 28, 1942. The device, however, is not confined to use only with the particular apparatus shown in said patent, and has general application in the lawn mower sharpening art.

During regular operation of a lawn mower, the spirally disposed blades of the reel, on rotation of the reel, traverse the surface of a bed knife or fixed shear, so as to shear off the blades of grass caught therebetween. In this connection, the cutting edge of the blade should have a predetermined backrake or angle relative to the surface of the bed knife.

In this connection, there has not to my knowledge been provided any means for tiltably adjusting the reel upon the lawn mower sharpening apparatus in a direction transverse of the line of movement of the grinding wheel when said grinding wheel is moved longitudinally of the cutting blades for the purpose of sharpening the same, this tiltable adjustment of the lawn mower reel being necessary for the purpose of locating the blades in a predetermined position relative to the grinding wheel so that the wheel when moved longitudinally of the blades, will not only put a proper cutting edge on said blades considering the blades longitudinally, but also will grind said cutting edge at a proper angle transversely of the blades, that is, with a prescribed backrake.

Heretofore, it has been common in the art to level the lawn mower reel upon the sharpening apparatus so that the blades of the reel will be perfectly horizontal, thus to be in parrallelism with the path of movement of the grinding wheel as said wheel is shifted longitudinally of the blades. This causes the blades to be ground down uniformly from end to end thereof. However, it has not suggested itself previously in the art to my knowledge, that the reel should not only be leveled longitudinally, but also, should be adjusted transversely so that the grinding wheel center, reel center, and bed knife are all so located in relation to one another as to cause placement of the blade of the reel at a particular angle to the periphery of the grinding wheel, thus to grind the desired backrake thereon.

The object of the present invention is to provide a reel locator which will locate the reel relative to the grinding wheel in this manner.

Another important object is to provide a locator of the character described which will permit the transverse tiltable adjustment of the lawn mower reel to be made in a few seconds, and with complete ease.

Still another object is to provide a locator of the character described which can be manufactured at a minimum of cost.

Still another object is to provide a reel locator of the character stated which will embody a minimum of parts, so as not to readily get out of order.

Yet another object is to provide in a reel locator adjustably connected upper and lower portions adapted to be readily adjusted for use of the locator on reels of different diameters.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings.

Figure 1:
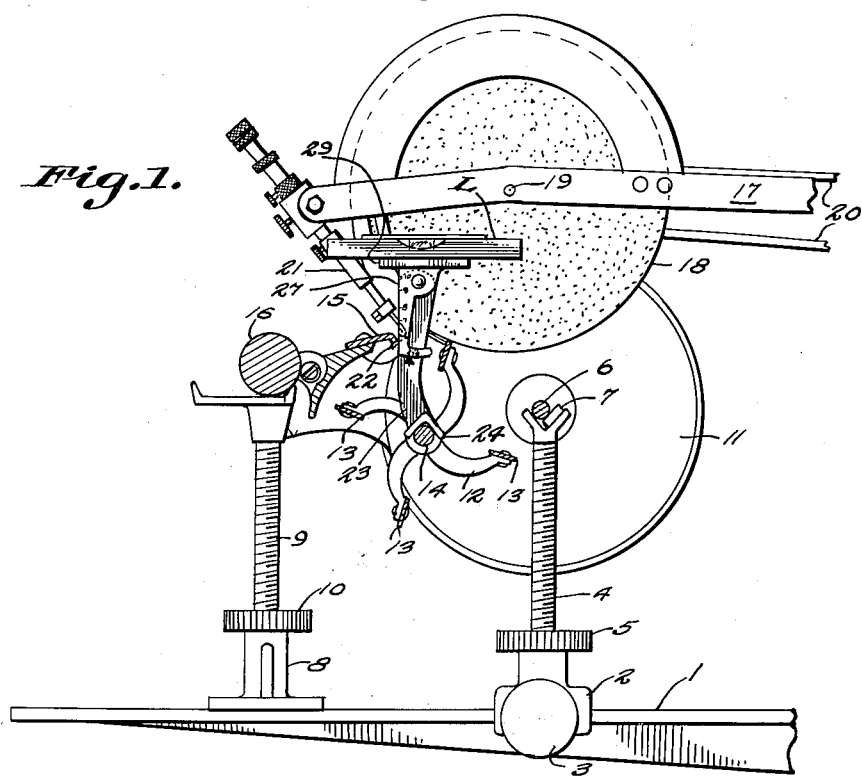
Fig. 1 is a side elevational view of the reel locator shown in position upon a lawn mower reel, said reel being shown in transverse section and being illustrated in position upon the reel support of a lawn mower sharpener, the grinding wheel of said sharpener being illustrated immediately above the reel.

Referring to the drawings in detail, the lawn mower sharpening apparatus a portion of which is illustrated in Fig. 1 does not constitute any part of the present invention, portions of the apparatus being illustrated merely to show how the device that constitutes the present invention is used. Accordingly, the only portions of the apparatus illustrated are those portions that support the lawn mower reel, and the grinding wheel used for sharpening the blades of the reel.

The lawn mower sharpener includes a pair of supporting brackets 1 which extend laterally from the lawn mover sharpener frame, not shown, said brackets 1 being spaced longitudinally of said frame for supporting opposite ends of a lawn mower reel.

Mounted upon each bracket 1 is a slide 2, which, when adjusted to a selected position upon the bracket is secured in the desired position by means of a set screw 3.

Mounted in the slide 2 and adjustable upwardly and downwardly therein is the upstanding support 4 here shown as a screw, said support being adjustable upwardly or downwardly by means of a threaded adjusting wheel 5 seating upon the top surface of the slide 2 and threadedly engaged with said support. At its upper end the support 4 is notched to receive the axle 6 of a lawn mower, and if found desirable or necessary, shims or blocks 7 can be used to position the axle properly in the supporting notch.

Fixedly mounted upon the bracket 1, in spaced relation to the support 4, is a guide 8, in which is mounted for vertical adjustment a support 9 having threaded engagement with the adjusting wheel 10. At its upper end the support 9 is provided with a widened ledge member adapted to support the ground roller of the lawn mower.

As may be noted by reference to Fig. 1, the lawn mower is supported at opposite ends by the supports 4, the lawn mower being inverted for the purpose of being sharpened. The lawn mower illustrated in the present instance includes ground wheels 11, and also includes the cutting reel 12 having the cutting blades 13 rotatable with the reel shaft 14.

The lawn mower also includes the bed knife 15, and the ground roller 16, the ground roller 16 being supported upon the ledge member carried at the upper ends of the supports 9.

With further reference to the lawn mower sharpening apparatus, said apparatus includes in the present instance the vertically swingable arm 17 extending from the grinding wheel carriage, not shown, said arm 17 constituting a support for a grinding wheel 18 that is rotatable upon the grinding wheel 18 that is rotatable upon the grinding wheel shaft 19 carried in the arm 17. The grinding wheel 18 is powered by a belt 20 extending from a suitable source of power, not shown. In accordance with regular practice, the lawn mower sharpening apparatus includes the anchor 21, well known in the art, this being previously adjusted to a selected position relative to the grinding wheel and including at its lower end the hook 22 which is engaged under the bed knife 15 so as to cause the grinding wheel to be properly located relative to said bed knife, and thus to be also properly located relative to the lawn mower blades 13 to be sharpened. In this way, the grinding wheel when moved longitudinally of the blades, does not grind the blades to an excessive depth, but grinds them uniformly so that the cutting edge will be parallel to the edge of the bed knife.

All this is conventional construction, both for a lawn mower reel and for a lown mover sharpener. The description which has so far been provided is intended mainly to show the general location of the lawn mower reel relative to the support therefor and relative to the grinding wheel, and in practice, the lawn mower is leveled longitudinally and the grinding wheel carriage is shifted longitudinally of said cutting reel, so that said blades 13 are ground from end to end thereof by the grinding wheel. The hook 22 engaging under and sliding longitudinally of the bed knife to provide a guide for this purpose.

Figure 4:
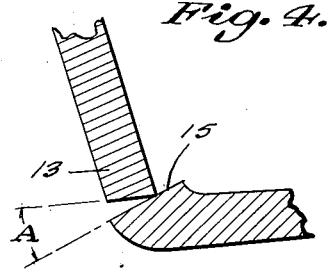
Fig. 4 is a greatly enlarged fragmentary transverse section through the bed knife and one of the blades of a lawn mower illustrating the backrake or angle of the cutting edge of said blade relative to the bed knife.

In this connection, it will be seen that the longitudinal levelling of the reel does not necessarily position the blades at a particular angle relative to the periphery of the grinding wheel 18 for formation of a proper backrake thereon. In this connection, said backrake has been illustrated particularly in Fig. 4 at A, this being the angle between the cutting edge of the blade 13 and the surface of the bed knife 15 when said blade wipes across said surface.

Proper positioning of the blade to achieve this end involves the location of the center of the reel shaft 14 at a particular point relative to the edge of the bed knife 15 and to the center of the grinding wheel shaft 19. The adjustment of the bed knife figures into this locating operation because the location of the bed knife will determine the location of the grinding wheel, because the hook 22 of the grinding wheel anchor engages under said bed knife. And, the location of the center of the reel shaft relative to the bed knife and the grinding wheel center will determine the angle at which the blades are placed to the periphery of the grinding wheel, since said blades are rigid with said reel shaft.

Accordingly, I provide a reel locator, comprising a lower portion 23 formed from a suitable piece of metal material or the like, this being formed with the notched saddle 24 at its lower end, and having an opening 25 formed in its upper end, through which opening extends the bolt 26, that connects to the lower portion an upper portion 27 having the bolt-receiving opening 28. The upper and lower portions are thus connected for pivotal adjustment, and after being pivotally adjusted relative to each other are clamped together in selected positions of adjustment by means of a clamping nut 28'.

The upper portion 27 is formed at its upper end with a flat top surface 29 on which is adapted to be placed a conventional spirit level L.

With further reference to the upper portion 27 of the locator, this has a front edge 30 at right angles to the top surface 29, or nearly so. Spaced vertically of the front edge 30 is a series of indicia 31, denoting different size reel diameters.

At its lower end the upper portion 27 is formed with the arcuate laterally extended index arm 32 provided with the indicia 33 also denoting reel diameters, the lower portion 23 having an index marking 34 adapted to be brought into coincidence with any of the indicia 33.

In use of the locator, it will be understood that initially, the arm 17 will have been swung upwardly together with the grinding wheel 18 and the anchor 21, so that it will be out of the way during the initial positioning of the lawn mower. In any event, the lawn mower is placed upon the supports 4 and 9 as illustrated in Fig. 1, and is leveled horizontally in the usual manner.

Figure 2:
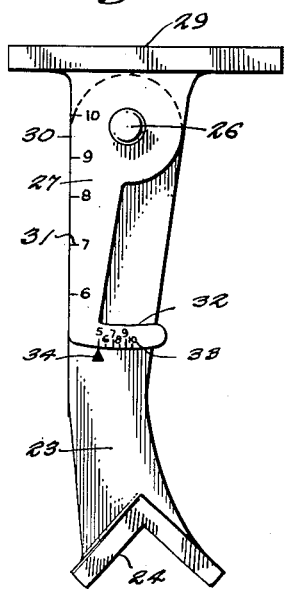
Fig. 2 is an enlarged side elevational view of the locator.
Figure 3:
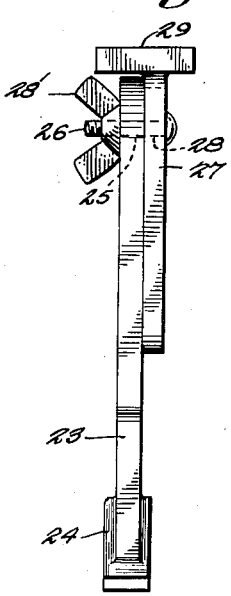
Fig. 3 is an edge elevational view of the locator as viewed from the left of Fig. 2.

The locator shown in Fig. 2 is now placed in position, with the reel shaft 14 being received in the saddle 24 and supporting the locator, and with the front edge 30 of the upper portion of the locator being positioned against the edge of the bed knife 15.

The indicia 31 of the upper portion will indicate the reel diameter, the edge of the bed knife serving as an index marking for this purpose.

Thereafter, the clamping nut 28' is loosened, and the upper and lower portions of the locator are pivotally adjusted relative to each other, until the index marking 34 coincides with that graduation 33 that will be appropriate for the diameter of the particular reel.

A level L is now placed upon the flat top surface 29 of the upper portion 27, and the user operates the adjusting wheel 10 upwardly or downwardly until the bubble of the level is centered.

This means that the lawn mower has been transversely adjusted in such a manner as will cause a proper backrake to be ground upon the blades 13 when the grinding wheel is moved longitudinally thereof.

The locator is now removed and the arm 17 swung downwardly, the hook 22 being engaged under the bed knife 15. The blades are now sharpened in the regular manner and when sharpened, it will be found to have a proper backrake.

It has been found in actual practice of the invention upon full sized reels being sharpened upon lawn mower sharpening apparatus of the general type, that the locator serves with full efficiency to so locate the grinding wheel, reel, and bed knife to each other as to result in the provision of a prescribed and highly accurate backrake upon the blades 13.

What is claimed is:

A reel locator comprising an elongated lower portion having an inverted V-shaped reel shaft receiving notch opening through one end thereof, an upper portion pivotally connected intermediate its ends to the lower portion adjacent the end thereof remote from the notch, a flat spirit level supporting surface carried by the upper portion, a lawn mower bed knife engaging side face carried by the upper portion and extending perpendicular to the level supporting surface, indices carried by the upper portion adjacent the side face for indicating reel diameters, an index arm carried by the upper portion adjacent the end thereof remote from the level supporting surface, said arm extending across the lower portion and bearing indices denoting reel diameters, an index carried by the lower portion adjacent the index arm and adapted to be brought into registration with a selected index on the index arm for establishing a definite angular relation between the notch and the level supporting surface, and means for securing said portions in selected positions to which they are pivotally adjusted.

WILLIAM V. SMITH.

REFERENCES CITED

The following references are of record in the file of this patent:

UNITED STATES PATENTS

| Number | Name | Date |
|---|---|---|
| 406,774 | Saunders | July 9, 1889 |
| 1,749,980 | Loeser | Mar. 11, 1930 |
| 2,213,148 | Pyle | Aug. 27, 1940 |
| 2,468,395 | Fredin | Apr. 26, 1949 |